Sept. 3, 1968  B. BERMAN  3,400,323
STATIC VOLTAGE REGULATOR FOR A D.C. GENERATOR
Filed Feb. 21, 1964
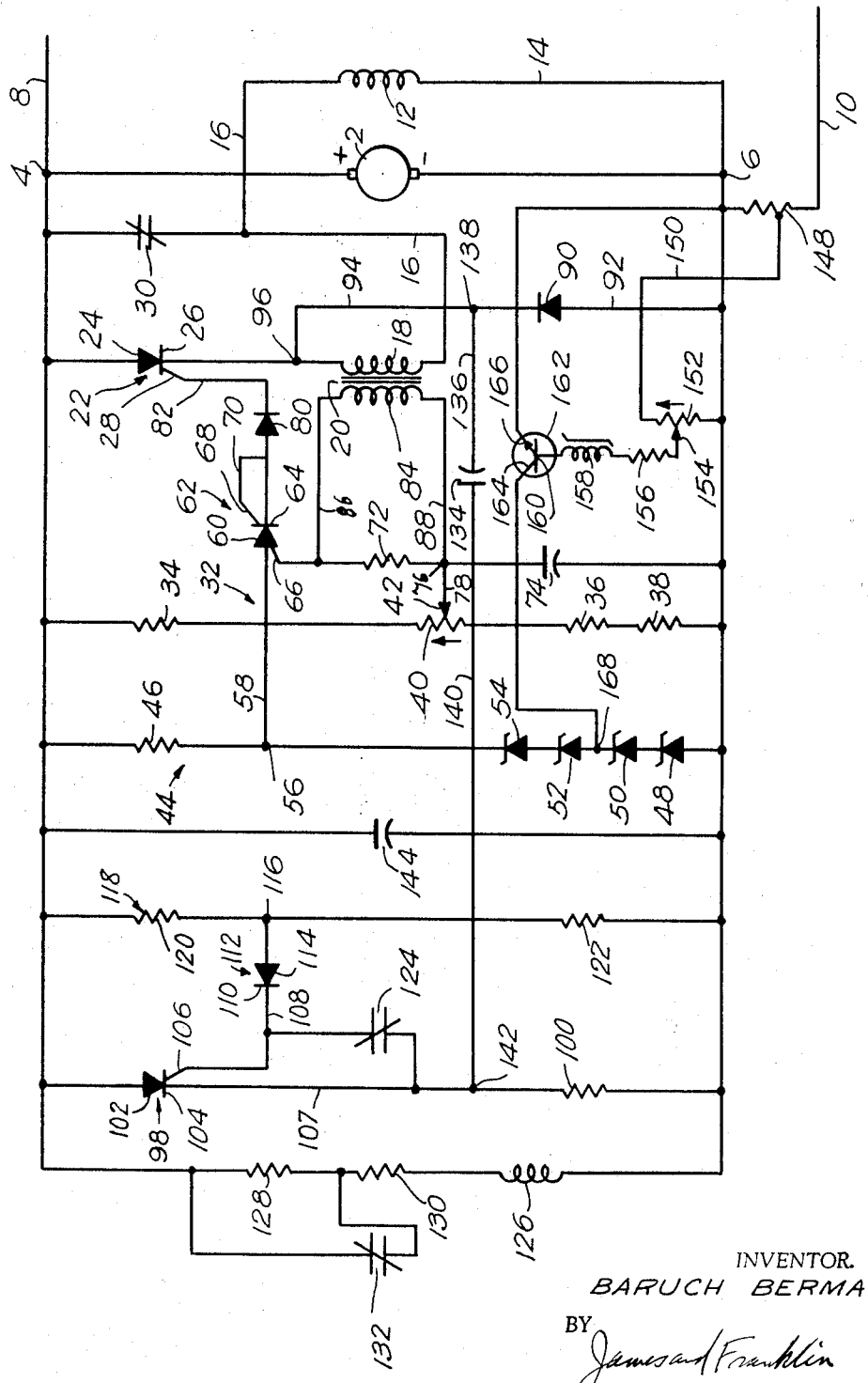
INVENTOR.
BARUCH BERMAN
BY James and Franklin
ATTORNEYS

United States Patent Office 3,400,323
Patented Sept. 3, 1968

3,400,323
STATIC VOLTAGE REGULATOR FOR A
D.C. GENERATOR
Baruch Berman, River Vale, N.J., assignor to Electric Regulator Corporation, Norwalk, Conn., a corporation of New York
Filed Feb. 21, 1964, Ser. No. 346,522
22 Claims. (Cl. 322—25)

The present invention relates to a static voltage regulator for D.C. generators and the like in which the static units are primarily of the "on" type (e.g. silicon controlled rectifiers), in conjunction with which a current-limiting feature may be incorporated.

Regulation of the voltage output of D.C. generators by means of a static system comprising solid state devices has been proposed in the past. However, the solid state devices used in those portions of the circuit called upon to carry appreciable power have included devices such as transistors the power-handling capacity of which is highly limited. Accordingly, the utility of such systems has been correspondingly limited, or else unduly complex circuitry had to be employed.

Prior art regulating systems where the energization of the generator field winding from the armature is modulated in order to control the output voltage have generally been of either of two types. In one the frequency with which the field winding is energized by substantially uniform pulses from the armature is varied in order to maintain the output voltage at a desired value. In the other the frequency of energization of the field winding remains constant, but the time duration (pulse width) of each individual energization is varied. Each of these systems has advantages and disadvantages.

It is the prime object of the present invention to devise a D.C. generator voltage regulation system which utilizes, in the power-handling portions of the circuit, only solid state devices which have high power handling capacity, thus permitting use of the regulator in a much wider variety of applications, and under considerably more severe operating conditions, than has previously been considered possible. A second primary object of the present invention is to device a regulating system which produces regulation by a combination of frequency variation and pulse width variation in the energization of the field winding from the armature, thereby achieving the advantages of both such systems and minimizing the disadvantages of each.

It is a further object of the present invention to utilize, in conjunction with such a voltage regulation system, circuitry which will provide a current limiting feature.

It is well known that "on" type solid state devices such as silicon rectifiers have much higher power handling capacity and much lower dissipation than gradually controllable solid state devices such as those of the transistor type. These "on" type solid state devices are here broadly termed "valves," since they function in a manner similar to valves in a hydraulic or pneumatic circuit, permitting the current either to flow or not to flow. When these "valves" permit the current to flow therethrough, they will here be described as being in on condition (this corresponding to a closed electrical switch), and when these "valves" prevent the flow of current therethrough they will be here described as being in off condition (corresponding to an open electrical switch). These valves are provided with an anode and a cathode connected in the circuit through which current flow is to be controlled, and they are also provided with a gate. Their operating characteristics are such that they will turn on, so that current will flow therethrough, only when two conditions are met, to wit, (1) that the voltage difference across anode and cathode is in the proper direction and has a proper magnitude, and (2) that the gate is properly energized. Once these valves are turned on, so that current flows, the gate loses control, and current will continue to flow despite the energization of the gate until the voltage difference between anode and cathode is reversed. This characteristic of these devices— that they can be turned on by a gate but cannot be turned off until they are reverse-biased—has made their use in circuits of the type under discussion very difficult, despite the obvious power-handling advantages which would be attendant upon their use.

In the system of the present invention a gate-controlled silicon rectifier is used to connect and disconnect the generator field and the armature. When the field is connected to the armature it is energized thereby, thus increasing the output voltage of the armature. Means are provided for turning this silicon rectifier valve on periodically, maintaining it on for a short period of time so as to energize the field, and then turning the valve off so as to permit the field to collapse. The relationship between the time that the field is energized and the time that the field is not energized will control the voltage output. Each time that this field-energizing valve is turned off the output voltage from the armature is measured or sampled, and if that voltage is below a predetermined nominal value, the field-energizing valve is again turned on. The intermittent turning on and off of the field-energizing valve is accomplished by a second silicon rectifier eleccally connected to a time delay circuit so that this second or control valve goes on and off periodically. The two valves are operatively connected together so that as each one turns on to permit current to flow therethrough the other valve is turned off.

As a result there is a periodical sampling or measurement of the output voltage, and the armature is electrically connected to the generator field intermittently, at a frequency and for individual durations of energization pulses such as to maintain the output voltage at desired value.

It is necessary, for proper operation of the system, that as each of the valves turns on to permit current to flow therethrough the other valve be turned off. If both valves are on at the same time the system will not function. Means are provided for ensuring, as the generator begins to be driven by the prime mover, that the two valves will not be on at the same time. This means comprises a separate voltage-sensing instrumentality such as a voltage-sensitive relay, which connects the armature directly to the field winding during the first portion of the start-up, which then renders the first valve operative while maintaining the second valve in off condition until the voltage builds up to a still greater value, and then conditions the system for normal operation, permitting the second valve to shift to on position when appropriate, thereby automatically turning off the first valve and starting the proper sequence of operations.

The operation of the first valve is controlled by comparing a voltage derived from the voltage output of the armature with a reference voltage. Means may also be provided for sensing the current which the armature supplies to a load and varying the reference voltage in accordance with that current, thereby producing a current-limiting feature.

The circuit can be readily designed to meet desired requirements as to sampling rate and the like through the simple modification of the parameters of reliable circuit elements such as capacitors and resistors. A high degree of accuracy can be attained, and only circuit components capable of handling comparatively large amounts of power over exceedingly long times are used where such characteristics are desired.

To the accomplishment of the above, and to such other objects as may hereinafter appear, the present invention relates to a static voltage regulation system for a D.C. generator, as defined in the appended claims, and as described in this specification, taken together with the accompanying drawing, showing a circuit diagram of a preferred embodiment.

The D.C. generator regulation of which is to be achieved comprises an armature 2 having positive and negative output terminals 4 and 6 respectively. Leads 8 and 10 extend from the terminals 4 and 6 respectively to an external load. The armature 2 rotates within a magnetic field derived at least in part from the generator field winding 12. The greater the energization of the field winding 12, the stronger will be the magnetic field produced thereby and the greater will be the voltage output across the terminals 4 and 6.

The lower end of the field 12 is connected by lead 14 to the negative armature terminal 6. The upper end of the field 12 is connected to the positive armature terminal 4 by lead 16, primary winding 18 of transformer 20, and silicon controlled rectifier 22, the latter having an anode 24 connected to the positive terminal 4, a cathode 26 connected to the upper end of the primary winding 18, and a gate electrode 28. A normally closed switch 30 is connected between positive terminal 4 and the lead 16 in shunt with the silicon controlled rectifier valve 22 and the armature primary 18.

A voltage divider generally designated 32 and comprising resistors 34, 36 and 38 and potentiometer 40, is connected between the terminals 4 and 6, the potentiometer 40 having an adjustable slider 42. Also connected across the terminals 4 and 6 is a reference voltage circuit generally designated 44 and comprising resistor 46 and Zener diodes 48, 50, 52 and 54. The action of the Zener diodes is such that so long as at least a minimal voltage is applied across the circuit 44 the point 56 between the resistor 46 and the Zener diode 54 will be at a voltage maintained constant despite variations in the voltage applied to circuit 44. Lead 58 connects the point 56 to the anode 60 of a silicon controlled switch valve 62 having a cathode 64, anode gate electrode 66, and cathode gate electrode 68. Since in this instance only anode gate control is desired, the cathode gate electrode 68 is rendered ineffective by being shorted to the cathode 64 by lead 70. The anode gate 66 is connected to the negative terminal 6 by resistor 72 and capacitor 74, and potentiometer slider 42 is connected to point 76 between the resistor 72 and the capacitor 74 by lead 78. The cathode 64 of the silicon controlled switch valve 62 is connected by rectifier 80 and lead 82 to the gate electrode 28 of the silicon controlled rectifier valve 22. The secondary winding 84 of the transformer 20 is connected across resistor 72 by leads 86 and 88.

A "flyback" or discharge rectifier 90 is connected across the field 12. Lead 92 connects the anode of the rectifier 90 to the lower end of the field 12, and lead 94 connects the cathode of the rectifier 90 to point 96 located between the transformer primary 18 and the cathode 26 of the silicon controlled rectifier valve 22.

Another silicon controlled rectifier 98 is connected across the terminals 4 and 6 in series with resistor 100. The anode 102 of the rectifier 98 is connected to the positive terminal 4, the cathode 104 is connected to lead 107 which extends to the resistor 100, and its gate electrode 106 is connected by lead 108 to the cathode 110 of rectifier 112. The anode 114 of that rectifier is connected to point 116 on voltage divider circuit 118 comprising resistors 120 and 122 connected across the terminals 4 and 6. A normally closed switch 124 connects the gate electrode 106 of the valve 98 to the cathode 104 thereof, thus rendering the gate 106 ineffective for so long as the switch 124 is closed and thereby maintaining the valve 98 turned off and preventing it from turning on.

The normally closed switches 30 and 124 are adapted to be opened at appropriate times, as will be described below, under the control of a voltage-sensing instrumentality such as a voltage sensitive relay, that relay comprising a coil 126 connected across the terminals 4 and 6 in series with resistors 128 and 130. A normally closed switch 132, also under control of the coil 126, is connected across the resistor 128, shorting out the latter when the switch 132 is closed.

A commutating capacitor 134 has one end connected by lead 136 to point 138 on lead 94 and has its other end connected by lead 140 to point 142 on lead 107. The point 138 is directly connected to the cathode 26 of the valve 22 and the point 142 is directly connected to the cathode 104 of the valve 98.

A filter capacitor 144 may be connected across the leads 4 and 6 if desired.

The operation of the system is as follows:

When the generator is first started up the armature 2 is directly connected to the field 12 through the normally closed switch 30. As the armature is rotated residual magnetic fields will cause it to generate a voltage which will pass through switch 30 and energize the field 12, thus causing more voltage to be generated, that additional voltage additionally energizing field winding 12, thus causing additional voltage output from the armature 2, and so on. Initially the voltage output will be insufficient to energize the Zener diodes 48–54, but as the voltage builds up those Zener diodes will eventually become energized, after which the point 56 will remain at a predetermined reference voltage (e.g., 20 volts) even though the voltage output from the armature 2 continues to increase. As the voltage across terminals 4 and 6 increases, the winding 126 will be increasingly energized, but the electromagnetic effect thereof preferably will not be sufficient to open the switch 30 until the Zener diodes 48–54 have been energized and the point 56 is at reference voltage.

Once the switch 30 opens the direct connection between the armature 2 and the field winding 12 will be broken. However, a voltage will be derived at the potentiometer slider 42, and that voltage will be transmitted to the gate 66 of the valve 62. If that voltage (hereinafter termed the signal voltage) is more negative than the reference voltage at point 56 (and hence at the anode 60 of the valve 62), as will be the case during this initial or start-up sequence, the valve 62 will turn on and the gate 28 of the valve 22 will be appropriately energized. The polarity of the anode 24 and cathode 26 of the valve 22 will already be properly biased, and hence the valve 22 will turn on, permitting current to flow therethrough and hence connecting the armature 2 to the field 12, thereby continuing energization of the field 12 and permitting the armature voltage to build up.

At any appropriate point while the armature voltage is building up the energization of the relay coil 126 will become sufficient to open the switch 132, thereby inserting the resistor 128 in series with a resistor 130 and the coil 126. The purpose of this is to limit the maximum current passing through the coil 126.

This condition, with valve 22 on and carrying current, may be maintained for any desired period of time, from a fraction of a second to very long periods, without harmful effects, because the valve 22 is eminently capable of carrying the requisite current virtually indefinitely without ill effect. Hence there will be no damage to the regulator even if the armature is rotated slowly for very long periods of time, as when the prime mover therefor is an internal combustion engine which is permitted to idle, either to conserve fuel or to provide a warm-up period.

During all this time the switch 124 has been closed, and the valve 98 has therefore been maintained in off condition with no current flowing therethrough. When the voltage across the terminals 4 and 6 reaches a desired value the switch 124 will be opened by the coil 126, and the circuit will then be in position to regulate. The primary function of the switch 124 is to ensure that valve 22 turns on first, and to prevent both of the valves 22 and 98 from turning on and staying on during the time of initial voltage build-up, since if they are both on the circuit will not function.

Before the switch 124 opens the point 142 is maintained at the voltage of point 116, which is some predetermined fraction of the total voltage across the terminals 4 and 6. If the armature output voltage be termed V, then the voltage at point 142 may be V/2. When the switch 124 opens this voltage discharges through resistor 100, but the gate 106 of the valve 98 remains at $V/2$ and the anode 102 thereof is at V. The cathode 104 of the valve 98 is at the same voltage as point 142, and when that voltage decays sufficiently, the time of the decay being determined by the relative values of capacitor 134 and resistor 100, the valve 98 will turn on, permitting current to flow therethrough.

When this occurs the point 142 will jump to a voltage V, an increase of $V/2$. This increase will be transmitted by commutating capacitor 134, in the form of a pulse, to point 138. The voltage at point 138 is always the same as that at the cathode 126 of the valve 22. Point 138 was at voltage V before this pulse is received, since the valve 22 is on, and the anode 24 of the valve 22 was also at voltage V. (The voltage drop through the valve 22 is here neglected for simplicity of explanation.) When the pulse from point 142 is received by point 138 its voltage rises to $3V/2$, and this reverse-biases the valve 22 and turns that valve off, electrically disconnecting the armature 2 from the winding 12 and terminating energization of the winding 12.

Thus it will be seen that when the valve 98 shifts from off to on, the valve 22 is turned off.

When energization of the field 12 is terminated, the field voltage tends to collapse through flyback rectifier 90, the voltage at the lower end thereof shifting to a negative value relative to the upper end thereof. This restores the proper bias across the anode 24 and cathode 26 of the valve 22 for turning that valve back on. However, whether the valve 22 will then turn on to permit current to flow therethrough will be determined by the energization of its gate 28, and this in turn will be determined by the relationship between the reference voltage 56 and the signal voltage at potentiometer slider 42. If the voltage across terminals 4 and 6 is sufficiently high, the valve gate 28 will not be energized and valve 22 will remain off. On the other hand, if the voltage across the terminals 4 and 6 is not as high as desired, the valve 22 will be turned on and the armature 2 will again energize the field 12.

When the valve 22 turns on the voltage at point 138, theretofore slightly below the voltage of terminal 6 because of the collapse of the field voltage through rectifier 90, will be raised to V. The commutating capacitor 134 will transmit this voltage to point 142, theretofore at voltage V (since valve 98 was on), thus raising the voltage at point 142, and at the cathode 104 of valve 98, to 2V. Since the anode 102 of valve 98 is at V, the valve 98 will be reverse-biased and will turn off.

Thus the shifting of the valve 22 from off to on causes the valve 98 to shift from on to off. The voltage at the cathode 104 of valve 98 will leak off through resistor 100, and after a predetermined period of time will become less than the voltage at gate 106, the valve 98 will turn on, this will turn the valve 22 off, and the sequence will continue.

If, after the valve 22 has been turned off and then conditioned for turning on, insofar as the bias across its anode 24 and cathode 26 is concerned, by the discharge of the field winding 12 through the flyback rectifier 90, and if the voltage across terminals 4 and 6 is sufficiently high, the valve 22 will remain off and the valve 98 will tend to remain on. This situation may continue until the voltage output across terminals 4 and 6 falls sufficiently for the valve 28 to be closed (as it will after a time because of the loss of energization of field winding 12, no longer connected to the armature 2). Alternatively, because of circuit conditions involving stray inductances, the inductances of the armature 2 and the field 12, the capacitance of the various circuit elements or the like, the valve 98 may oscillate between off and on conditions. This is not deleterious, because except during those instantaneous times when the valve 22 is pulsed to reverse-biased condition, the valve 22 stands ready, under control of the valve 62 and the signal voltage derived from potentiometer slider 42, to take control, turn off the valve 98 and re-energize the field 12 whenever the voltage output across terminals 4 and 6 decreases sufficiently.

The valve 62 is normally turned off when the valve 22 turns on, the turning on of the valve 22 causing its gate 28 to come to a voltage close to that of the terminal 4, thus, in effect, back-biasing the valve 62, whose anode 60 is at reference voltage. The rectifier 80 is included in the circuit between the gate 28 of the valve 22 and the cathode 64 of the valve 62 in order to effectively prevent any actual reverse current flow, which would be deleterious to the valve 62. The function of the transformer 20 (an optional feature) is to ensure that the valve 62 is effectively turned off when the valve 22 turns off and for a predetermined short time thereafter. This it does by utilizing the collapse of the shunt field 12 through the flyback rectifier 90, the collapsing current passing through the primary winding 18, in order to apply a voltage pulse to the gate 66 of the valve 62 in a sense such as to oppose any turning-on signal which might be derived either from noise or from a bona fide signal sensed at the potentiometer 40. After the voltage pulse disappears, the valve 62 is free to once again perform its sampling or error-detecting function.

Capacitor 74 helps to filter out high frequency noise, thus helping to eliminate false signals, and, together with resistor 72, has an incidental effect on sampling changes.

The filter capacitor 144 assists in reducing the effects of noise, which might cause erroneous triggering of valve 62, and also permits the regulation system to function more uniformly with variations in the type of load—inductive, resistive or battery—connected between the lines 8 and 10.

It will thus be seen that the voltage regulating system as described converts an analogue signal derived from the potentiometer 40 into a digital signal turning valve 22 on and off at a frequency and for periods of time such as to control the energization of the shunt field 12, thereby to maintain the output voltage across the terminals 4 and 6 at a value determined by the setting of the slider 42 upon the potentiometer 40. The output voltage is intermittently sampled, at a frequency determined in part by the actual voltage output from the generator and in part by the circuit design (and particularly valve 98 and associated circuitry, which in effect acts as an oscillator), and the duration of each intermittent energization of the field is also varied, largely by the actual voltage output. The sampling rate can be tailored to the needs of a particular application through the use of simple engineering techniques. The inertia of the field winding 12 smooths out the overall effect of this intermittent field energization, with the result that effective and accurate voltage regulation is achieved. Since the controlling elements, and particularly the valves 22 and 98, are of the "on" type, which are capable of carrying high amounts of power with low power loss, the regulation system can be used in applications where high voltages and currents are involved, and under operating conditions where low energy dissipation is important, as where the armature generator is driven at low speeds for extended periods of time. This occurs, for example, where the prime mover for the generator is an internal combustion engine which requires extended warm-up before being brought to operating speed.

The system is very well adaptable to the incorporation thereinto of a current limiting circuit. A current sensing device 148, such as a shunt, is located in the output line and is connected by lead 150 and potentiometer 152 to the negative terminal 6. The potentiometer slider 154 is connected by resistor 156 and choke coil 158 to the base 160 of transistor 162. The emitter 166 and collector 164 of the transistor 162 are connected in series between point 168 and terminal 6, the point 168 being located between Zener diodes 50 and 52. The greater the current sensed in the output line 10, the higher is the voltage applied to the transistor base 160, the lower is the resistance of the transistor 162 to emitter-collector current, and the greater the emitter-collector current flow the lower will be the reference voltage at the point 56. Since the valve 22 which connects the armature 2 to the field 12 turns on only when the voltage at the gate 66 is more negative than the voltage at anode 60, this reduction in reference voltage will have the effect of reducing energization of the field 12, thereby reducing the current. Thus the system, with the current limiting feature, will maintain voltage at rated value for so long as the load current is below a predetermined maximum, and if the current tends to rise above that maximum the current will take control.

Purely by way of example, the following circuit values are applicable to a system designed to regulate a voltage output at between 60 and 80 volts, the reference voltage at point 56 being 20 volts:

| | | |
|---|---|---|
| Transformer 20 | turns | 12–900 |
| Silicon controlled rectifier 22 | type | C–40B |
| Resistor 34 | ohms | 1000 |
| Resistor 36 | do | 300 |
| Resistor 38 | do | 35 |
| Potentiometer 40 | do | 0–100 |
| Resistor 46 | do | 2000 |
| Zener diodes 48–54 | type | 1N751 |
| Silicon controlled switch 62 | do | 3N59 |
| Resistor 72 | ohms | 200 |
| Capacitor 74 | mfd | 8 |
| Rectifier 80 | type | MR326 |
| Silicon controlled rectifier 98 | do | C–12B |
| Resistor 100 | ohms | 250 |
| Rectifier 112 | type | 1N645 |
| Rectifiers 120 and 122 | ohms | 1000 |
| Rectifier 128 | do | 150 |
| Rectifier 130 | do | 300 |
| Capacitor 134 | mfd | 5 |
| Capacitor 144 | mfd | 8 |
| Potentiometer 152 | ohms | 0–25 |
| Resistor 156 | do | 56 |
| Transistor 162 | type | 2N696 |

While but a single embodiment of the present invention has been here specifically disclosed, it will be apparent that many variations may be made therein, all within the spirit of the invention as defined in the following claims.

I claim:

1. A static voltage regulation system for a D.C. generator having an armature and a field winding, said armature having first and second output terminals of opposite polarity, said system comprising a first controllable rectifier type valve connected between said first terminal and one end of said field winding, said valve having a controlling gate, the other end of said field winding being connected to said second terminal, means for sensing the voltage across said terminals and actuating said gate in accordance therewith so as, when said voltage is below a predetermined value, to turn said first valve on, a second valve connected between said terminals, and means operatively connected between said valves and effective to (1) turn said second valve off when said first valve shifts from off to on, (2) turn said second valve on a predetermined period of time after it has turned off, and (3) turn said first valve off when said second valve shifts from off to on.

2. The system of claim 1, in which said voltage sensing means comprises a source of reference voltage, means for deriving a signal voltage related to the voltage between said terminals, means for comparing said reference voltage and said signal voltage and deriving an error voltage therefrom, and means for applying said error voltage to the gate of said first valve, and means for momentarily disabling said voltage sensing means when said first valve shifts from on to off.

3. The system of claim 1, in which said voltage sensing means comprises a source of reference voltage, means for deriving a signal voltage related to the voltage between said terminals, means for comparing said reference voltage and said signal voltage and deriving an error voltage therefrom, and means for applying said error voltage to the gate of said first valve, and in which said last two mentioned means comprise a third controllable rectifier type valve having first and second main electrodes and a controlling gate, one of said main electrodes being connected to said reference voltage, the other of said main electrodes being connected to the gate of said first valve, and said gate of said third valve being connected to said signal voltage.

4. The system of claim 1, in which said voltage sensing means comprises a source of reference voltage, means for deriving a signal voltage related to the voltage between said terminals, means for comparing said reference voltage and said signal voltage and deriving an error voltage therefrom, and means for applying said error voltage to the gate of said first valve, and in which said last two mentioned means comprise a third controlled rectifier type valve having first and second main electrodes and a controlling gate, one of said main electrodes being connected to said reference voltage, the other of said main electrodes being connected to the gate of said first valve, and said gate of said third valve being connected to said signal voltage, and means for momentarily disabling said voltage sensing means when said first valve shifts from on to off.

5. The system of claim 1, in which said voltage sensing means comprising a source of reference voltage, means for deriving a signal voltage related to the voltage between said terminals, means for comparing said reference voltage and said signal voltage and deriving an error voltage therefrom, and means for applying said error voltage to the gate of said first valve, and in which said last two mentioned means comprise a third controllable rectifier type valve having first and second main electrodes and a controlling gate, one of said main electrodes being connected to said reference voltage, the other of said main electrodes being connected to the gate of said first valve, and said gate of said third valve being connected to said signal voltage, and, in combination therewith, a load circuit connected to said terminals, and current limiting means comprising means operatively connected to said load circuit for sensing the current therein and operatively connected to said reference voltage for lowering the latter when the sensed current exceeded a predetermined value.

6. The system of claim 1, in which said voltage sensing means comprises a source of reference voltage, means for deriving a signal voltage related to the voltage between said terminals, means for comparing said reference voltage and said signal voltage and deriving an error voltage therefrom, and means for applying said error voltage to the gate of said first valve, and in combination therewith, a load circuit connected to said terminals, and current limiting means comprising means operatively connected to said load circuit for sensing the current therein and operatively connected to said reference voltage for lowering the latter when the sensed current exceeds a predetermined value.

7. In the system of claim 1, means for preventing said second valve from turning on until said voltage output attains a predetermined minimum value.

8. In the system of claim 1, means for preventing said predetermined valve from turning on until said voltage output attains a second minimum value, and in which said voltage sensing means comprises a source of reference voltage, means for deriving a signal voltage related to the voltage between said terminals, means for comparing said reference voltage and said signal voltage and deriving an error voltage therefrom, and means for applying said error voltage to the gate of said first valve, and in which said last two mentioned means comprises a third controllable rectifier type valve having first and second main electrodes and a controlling gate, one of said main electrodes being connected to said reference voltage, the other of said main electrodes being connected to the gate of said first valve, and said gate of said third valve being connected to said signal voltage.

9. In the system of claim 1, means for preventing said second valve from turning on until said voltage output attains a predetermined minimum value, and in which said voltage sensing means comprises a source of reference voltage, means for deriving a signal voltage related to the voltage between said terminals, means for comparing said reference voltage and said signal voltage and deriving an error voltage therefrom, and means for applying said error voltage to the gate of said first valve, and in which said last two mentioned means comprise a third controllable rectifier type valve having first and second main electrodes and a controlling gate, one of said main electrodes being connected to said reference voltage, the other of said main electrodes being connected to the gate of said first valve, and said gate of said third valve being connected to said signal voltage, and means for momentarily disabling said voltage sensing means when said first valve shifts from on to off.

10. In the system of claim 1, means for preventing said second valve from turning on until said voltage output attains a predetermined minimum value, and in which said voltage sensing means comprises a source of reference voltage, means for deriving a signal voltage related to the voltage between said terminals, means for comparing said reference voltage and said signal voltage and deriving an error voltage therefrom, and means for applying said error voltage to the gate of said first valve, and in which said last two mentioned means comprises a third controllable rectifier type valve having first and second main electrodes and a controlling gate, one of said main electrodes being connected to said reference voltage, the other of said main electrodes being connected to the gate of said first device, and said gate of said third valve being connected to said signal voltage, and, in combination therewith, a load circuit connected to said terminals, and current limiting means comprising means operatively connected to said load circuit for sensing the current therein and operatively connected to said reference voltage for lowering the latter when the sensed current exceeds a predetermined value.

11. In the system of claim 1, means for preventing said second valve from turning on until said voltage output attains a predetermined minimum value and in which said voltage sensing means comprises a source of reference voltage, means for deriving a signal voltage related to the voltage between said terminals, means for comparing said reference voltage and said signal voltage and deriving an error voltage therefrom, and means for applying said error voltage to the gate of said first valve, and in which said last two mentioned means comprise a third controllable rectifier type valve having first and second main electrodes and a controlling gate, one of the said main electrodes being connected to said reference voltage, the other of said main electrodes being connected to the gate of said first device, and said gate of said third valve being connected to said signal voltage, and, in combination therewith, a load circuit connected to said terminals, and current limiting means comprising means operatively connected to said load circuit for sensing the current therein and operatively connected to said reference voltage for lowering the latter when the sensed current exceeds a predetermined value, and means for momentarily disabling said voltage sensing means when said first valve shifts from on to off.

12. In the system of claim 1, means for preventing said second valve from turning on until said voltage output attains a predetermined minimum value and in which said voltage sensing means comprises a source of reference voltage, means for deriving a signal voltage related to the voltage between said terminals, means for comparing said reference voltage and said signal voltage and deriving an error voltage therefrom, and means for applying said error voltage to the gate of said first valve, and in which said last two mentioned means comprise a third solid state valve having first and second main electrodes and a controlling gate, one of said main electrodes being connected to said reference voltage, the other of said main electrodes being connected to the gate of said first device, and said gate of said third valve being connected to said signal voltage, and, in combination therewith, a load circuit connected to said terminals, and current limiting means comprising means operatively connected to said load circuit for sensing the current therein and operatively connected to said reference voltage for lowering the latter when the sensed current exceeds a predetermined value, and means for momentarily disabling said voltage sensing means when said first valve shifts from on to off, and a flyback rectifier connected across said field winding.

13. A static voltage regulation system for a D.C. generator having an armature and a field winding, said armature having positive and negative terminals, said system comprising said field winding and a first controllable rectifier type valve connected in series between said terminals, said first valve having a controlling gate, a flyback rectifier connected across said field winding, a source of reference voltage, a second controllable rectifier type valve conductively series connected between said reference voltage source and the gate of said first valve, said second valve having a controlling gate, means for deriving a signal voltage corresponding to the voltage across said terminals, said means being connected to the gate of said second valve, a third controllable rectifier type valve connected across said terminals in series with a resistor, a commutating capacitor connected from a point between said resistor and said third valve and a point between said first valve and said field winding, said commutating capacitor, in conjunction with said resistor, being effective to (1) turn said third valve off when said first valve shifts from off to on, (2) turn said third valve on a predetermined period of time after it has turned off, and (3) turn said first valve off when said third valve shifts from off to on.

14. In the system of claim 13, means for preventing said third valve from turning on until said voltage output attains a predetermined minimum value.

15. A static voltage regulation system for a D.C. generator having an armature and a field winding, said armature having positive and negative terminals, said system comprising a transformer having primary and secondary windings, said field winding, said transformer primary, and a first controllable rectifier type valve connected in series between said terminals, said first valve having a controlling gate, a flyback rectifier connected across said field winding and said transformer primary, a source of reference voltage, a second controllable rectifier type valve connected between said reference voltage source and the gate of said first valve, said second valve having a controlling gate, means for deriving a signal voltage corresponding to the voltage across said terminals, said means being connected to the gate of said second valve, a third controllable rectifier type valve connected across said terminals in series with a resistor, a commutating capacitor connected from a point between said resistor and said third valve and a point between said first valve and said field winding, said transformer secondary being operatively connected to said signal-deriving means, said commutating capacitor, in conjunction with said resistor, being effective to (1) turn said third valve off when said first valve shifts from off to on, (2) turn said third valve on a predetermined period of time after it has turned off, and (3) turn said first valve off when said third valve shifts from off to on, said transformer secondary being effective to actuate the gate of said second valve to turn said second valve off when said first valve shifts from on to off.

16. In the system of claim 15, means for connecting said field winding across said armature independently of said first valve until the voltage output of said armature attains a minimum value.

17. In the system of claim 15, first means for connecting said field winding across said armature independently of said first valve until the voltage output of said armature attains a first minimum value, and second means for preventing said third valve from turning on until said voltage output attains a second minimum value higher than said first minimum value.

18. A static voltage regulation system for a D.C. generator having an armature and a field winding, said armature having positive and negative terminals, said system comprising said first winding and a first controllable rectifier type valve connected in series between said terminals, said first valve having a controlling gate, a flyback rectifier connected across said field winding, a source of reference voltage, a second controllable rectifier type valve conductively series connected between said reference voltage source and the gate of said first valve, said second valve having a controlling gate, means for deriving a signal voltage corresponding to the voltage across said terminals, said means being connected to the gate of said second valve, a third controllable rectifier type valve connected across said terminals in series with a resistor, said third valve having a controlling gate, a commutating capacitor connected from a point between said resistor and said third valve and a point between said first valve and said field winding, and means for applying to the gate of said third valve a voltage which is a predetermined fraction of the voltage between said terminals, said commutating capacitor, in conjunction with said resistor, being effective to (1) turn said third valve off when said first valve shifts from off to on, (2) turn said third valve on a predetermined period of time after it has turned off, and (3) turn said first valve off when said third valve shifts from off to on.

19. In the system of claim 18, first means for connecting said field winding across said armature independently of said first valve until the voltage output of said armature attains a first minimum value, and second means for preventing said third valve from turning on until said voltage output attains a second minimum value higher than said first minimum value.

20. A static voltage regulation system for a D.C. generator having an armature and a field winding, said armature having positive and negative terminals, said system comprising a transformer having primary and secondary windings, said field winding, said transformer primary, and a first controllable rectifier type valve connected in series between said terminals, said first valve having a controlling gate, a flyback rectifier connected across said field winding and said transformer primary, a source of reference voltage, a second controllable rectifier type valve connected between said reference voltage source and the gate of said first valve, said second valve having a controlling gate, means for deriving a signal voltage corresponding to the voltage across said terminals, said means being connected to the gate of said second valve, a third controllable rectifier type valve connected across said terminals in series with a resistor, said third valve having a controlling gate, a commutating capacitor connected from a point between said resistor and said third valve and a point between said first valve and said field winding, said transformer secondary being operatively connected to said signal-deriving means, and means for applying to the gate of said third valve a voltage which is a predetermined fraction of the voltage between said terminals, said commutating capacitor, in conjunction with said resistor, being effective to (1) turn said third valve off when said first valve shifts from off to on, (2) turn said third valve on a predetermined period of time after it has turned off, and (3) turn said first valve off when said third valve shifts from off to on, said transformer secondary being effective to actuate the gate of said second valve to turn said second valve off when said first valve shifts from on to off.

21. In the system of claim 20, means for connecting said field winding across said armature independently of said first valve until the voltage output of said armature attains a minimum value.

22. In the system of claim 20, first means for connecting said field winding across said armature independently of said first valve until the voltage output of said armature attains a first minimum value, and second means for preventing said third valve from turning on until said voltage output attains a second minimum value higher than said first minimum value.

References Cited

UNITED STATES PATENTS

| | | | |
|---|---|---|---|
| 3,143,665 | 8/1964 | Smith | 307—88 |
| 3,174,059 | 3/1965 | Waterman | 307—88 |
| 3,201,679 | 8/1965 | Buchanan et al. | 322—25 |
| 3,209,234 | 9/1965 | Bridgeman et al. | 322—28 |
| 3,209,236 | 9/1965 | Bridgeman | 322—28 |
| 3,253,210 | 5/1966 | Cummins | 322—28 |
| 3,263,155 | 7/1966 | Dietl | 322—28 |

ORIS L. RADER, *Primary Examiner.*

H. HUBERFELD, *Assistant Examiner.*